No. 781,902. PATENTED FEB. 7, 1905.
J. J. O'DELL.
STREET CAR FENDER.
APPLICATION FILED SEPT. 17, 1904.

2 SHEETS—SHEET 1.

Witnesses.
G. J. Mead
Florence Stockert

Inventor.
James J. O'Dell
By J.C. & H.M. Sturgeon
Attys

No. 781,902. PATENTED FEB. 7, 1905.
J. J. O'DELL.
STREET CAR FENDER.
APPLICATION FILED SEPT. 17, 1904.
2 SHEETS—SHEET 2.
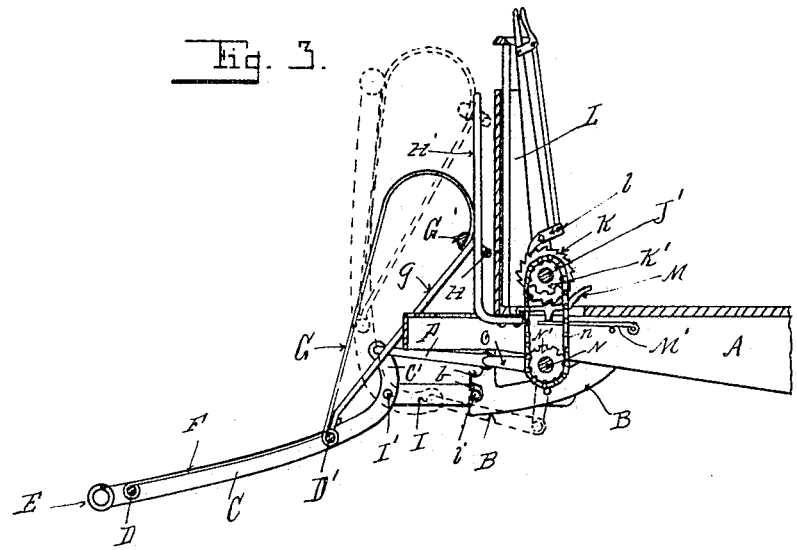
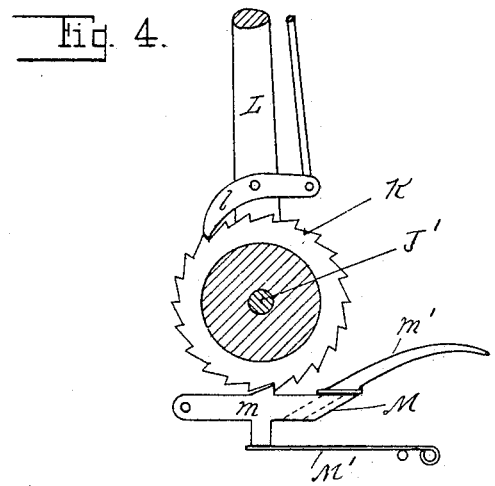
Witnesses.
G. J. Mead
Florence Stockert.
Inventor.
James J. O'Dell
By J. C. & H. M. Sturgeon
Attys No. 781,902. Patented February 7, 1905.

UNITED STATES PATENT OFFICE.

JAMES J. O'DELL, OF ERIE, PENNSYLVANIA.

STREET-CAR FENDER.

SPECIFICATION forming part of Letters Patent No. 781,902, dated February 7, 1905.

Application filed September 17, 1904. Serial No. 224,812.

*To all whom it may concern:*

Be it known that I, JAMES J. O'DELL, a citizen of the United States, residing at Erie, in the county of Erie and State of Pennsylvania, have invented certain new and useful Improvements in Street-Car Fenders; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to life-guards or fenders for street-car service, and has for its object the construction of a fender which may be removably attached to the ends of a street-car and provided with mechanism by means of which the fender may be folded up in front of the car when desired.

The features of my invention are hereinafter set forth and described, and illustrated in the accompanying drawings, in which—

Figure 1:
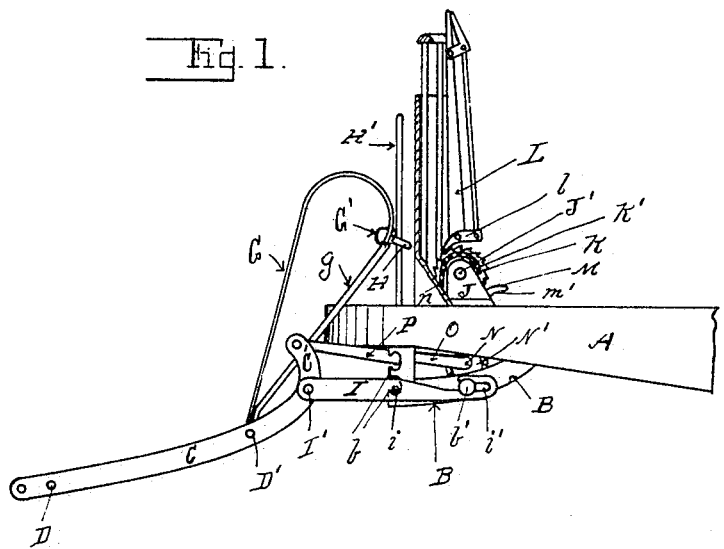
Figure 2:
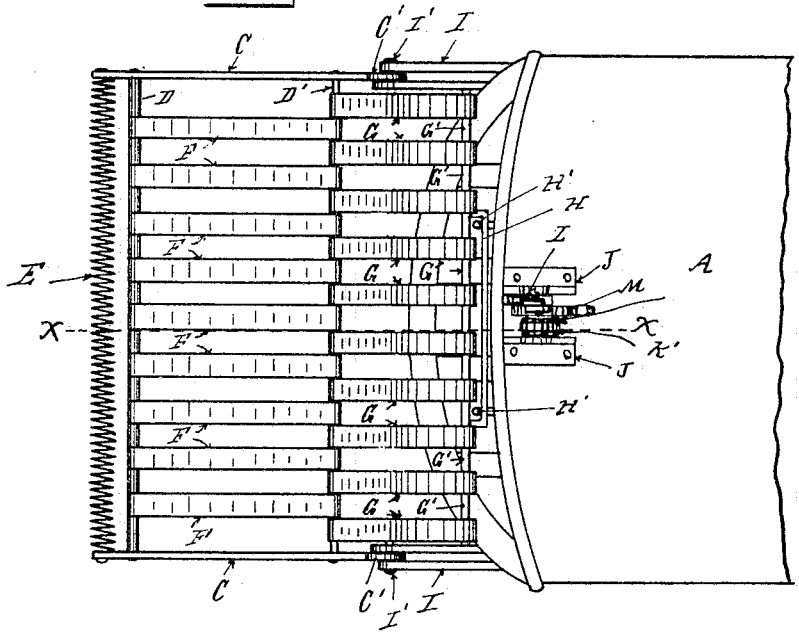

Figure 1 is a side view in elevation of my improved fender attached to a street-car platform. Fig. 2 is a top or plan view of the same. Fig. 3 is a section of the same on the line *x x* in Fig. 2. Fig. 4 is an enlarged detail of the ratchet-and-dog mechanism of the fender-operating mechanism.

In the drawings, A designates a street-car platform. To the under side of the sides of this platform I secure supports B, having notches *b* in the front ends thereof. The fender member is constructed of the side pieces C C, which are connected by the cross-pieces D and D'. The rear ends C' of the side pieces C are turned upward and forward in the form of bell-cranks. Across the front end of the fender I secure a flexible guard-piece E, which may be of a heavy spring or it may be constructed of any other suitable and desirable material. Extending from the cross piece or rod D to the cross piece or rod D' and secured thereto are thin strips or bars F, preferably of metal; but in lieu of the strips or bars F the space inclosed between the side pieces C C and D D' may be filled in with netting. Pivoted to the cross bar or rod D' is a guard member which is preferably formed of strips G of thin sheet metal, the upper ends of which are curved backward and downward in the form of semicircles, as shown in Figs. 1 and 3, and their ends secured to a cross-bar G', which is secured in the position shown in the drawings by means of the stay-rods or braces *g*. Secured to the bar G' and parallel thereto is a rod H, the ends of which are so formed that the rod H between its ends will be offset rearwardly from the upper ends of the guard-strips G and cross-bar G', so that the said rod H is adapted to embrace and slide upon the vertical guide-rods H' H', secured to the platform of the car, and securely retain the guard member in its proper position in front of the car-platform. This guard member may, however, be formed of a frame pivoted at its lower end to the cross-piece D' of the fender member and its upper end supported and retained in position by the guides H' H', the said frame supporting suitable netting within the space inclosed by said frame.

To the rear portion of each of the side bars C C of the fender member, at a point some distance downward from the upturned ends C' thereof, I pivot a bracket I by means of pivots I', which pivots constitute the fulcrums of the bell-crank levers formed on the side bars C, upon which the fender member is turned upward, thereby leaving a space under the fender when the same is folded up which may be occupied by any coupling mechanism necessary in coupling trailers to the motor-car, as is shown in Fig. 3 of the drawings. These brackets I have studs *i* (see Fig. 3) on their inside surfaces adapted to engage the notches *b* in the supports B, and the rear ends of the brackets I have loops or hooks *i''*, the front ends of which are open to permit the same to be disengaged from the headed studs *b'* on the outside surface of the supports B, the heads on said studs *b'* preventing the loops *i''* on the ends of the brackets I from slipping off of the studs *b'*. It will be seen that by means of the studs *i* engaging the notches *b* in the front of the supports B and the loops *i''* in the rear ends of the brackets I engaging the headed studs *b'* the brackets I, with the fender pivoted thereto, are supported in a horizontal position, as shown in Figs. 1 and 3.

Upon the platform A of the car I place shaft-supports J J, in which I mount a shaft J', and upon this shaft a ratchet-wheel K is securely fixed. I also securely fix upon the shaft J' a drum or sprocket-wheel K'. (See Fig. 3.) Upon the shaft J', at one side of the ratchet-wheel K, I mount a lever L, the shaft J' being the fulcrum therefor. This lever L is provided with a dog $l$ and mechanism for operating said dog, which may be in the ordinary form of tripping apparatus, as shown in the drawings, or in lieu thereof a spring may be used to retain the dog $l$ in engagement with the teeth of the ratchet-wheel.

To retain the ratchet-wheel K in the position to which it is turned by the lever L, I provide a dog or ratchet M, which I show as being beneath the ratchet-wheel K. While this dog M may be placed at any other convenient position with relation to the ratchet-wheel, I prefer the location of the dog M beneath the ratchet-wheel, as shown in the drawings. In Fig. 4 I have shown the construction of the dog M in detail, preferably constructed in two parts—a body portion $m$, which has a socket in the free end thereof, and a projection on the upper side adapted to engage the teeth of the ratchet-wheel K, the socket being indicated by broken lines in said Fig. 4. In this socket I place a foot-piece $m'$, which can be removed so that the dog M will not be accidentally stepped upon and the fender thereby released and permitted to fall down when not desired. This dog M is retained in engagement with the ratchet-wheel K by means of a spring M', secured beneath the platform A, as is clearly shown in Figs. 3 and 4.

Transversely underneath the platform A, I mount a crank-shaft N in suitable bearings, (not shown,) said shaft having cranks O on the ends thereof. Upon this crank-shaft N, at a point directly below the sprocket-wheel K' on the shaft J', I mount another sprocket-wheel or drum, N', and upon these two sprocket-wheels K' and N', I mount a sprocket-chain $n$, by means of which power may be communicated from the ratchet-wheel K, operated by the lever L, to the crank-shaft N under the platform A. I then pivotally connect the cranks O on the crank-shaft N to the extremities of the upwardly-curved ends C' of the side bars C of the fender by means of connecting-links P. The cranks O may, however, be connected to the said ends of the side bars C of the fender by any other suitable means in lieu of the cranks and connecting-links—as, for instance, a chain in lieu of the links P or a drum and chain in lieu of the cranks O and links P.

It will be seen that by means of the lever L the ratchet and sprocket wheels K and K' may be rotated, and through the sprocket-chain $n$, sprocket-wheel N', and shaft N power may be communicated to the cranks O, and that when the cranks O are turned downward into the position thereof shown by broken lines in Fig. 3 the fender, through its connection with said cranks O by means of the connecting-links P, will be turned or folded up against the front of the car-platform, as shown by broken lines in Fig. 3.

From the foregoing description and accompanying drawings it is obvious that a street-car fender and guard constructed in accordance with my invention can be raised or folded up by a person standing upon the platform A when it is desired so to do—as, for instance, when it is desired to couple a trailer to the motor-car or otherwise—and that a trailer can be coupled to a motor-car provided with my improved fenders without removing the fender therefrom.

Having thus fully described my invention, so as to enable others to construct and utilize the same, what I claim as new, and desire to secure by Letters Patent of the United States, is—

1. In a street-car fender, the combination with a street-car platform, of a fender member pivoted upon brackets, said brackets being detachably secured to the platform of the car, and ratchet, sprocket, chain and crank-shaft mechanism mounted upon the platform of the car adapted to raise and fold up the fender against the front of the platform, substantially as set forth.

2. In a street-car fender, the combination of a street-car platform, supports secured thereto, brackets removably secured upon said supports, a fender member pivoted to said brackets, upturned ends on the side bars of said fender member, a guard member pivoted to said fender member, guides for securing the upper end of the guard member, and lever, ratchet, sprocket, chain and crank-shaft mechanism for folding the fender and guard members up in front of the platform, substantially as set forth.

3. In a street-car fender the combination of a street-car platform, of a ratchet and sprocket wheel mounted upon supports upon the platform, lever and dog mechanism for operating the same, a crank-shaft mounted underneath said platform, a sprocket-wheel mounted on said crank-shaft, a sprocket-chain mounted upon and connecting said sprocket-wheels, cranks upon said crank-shaft, supports secured to said platform, brackets removably secured to said supports, a fender member pivoted to said brackets, upturned ends on the side bars of said fender member, a guard member pivoted to said fender member, in front of the supporting-pivot of the fender member, guides secured to the platform of the car adapted to support and guide the upper end of the guard member, and connecting bars or links between the cranks on the crank-shaft and the upturned ends of the side bars of the fender member, substantially as and for the purpose set forth.

4. The combination with a street-car platform, of bracket-arms removably secured to said platform, means for vertically adjusting the front ends of said bracket-arms, a fender member having side bars pivoted to the outer ends of said bracket-arms, upturned ends on said side bars in the rear of their pivoted points, cross-bars between said fender side bars, a resilient surface secured between the side and front and rear cross-bars of the fender, a guard member pivoted to the fender member, a resilient surface thereon, vertical guides on the car-platform in which the upper edge of the guard member operates, a transverse shaft mounted in supports on the under side of the car-platform, cranks on the ends of said shaft, links connecting said cranks and the upturned ends of the side bars of the fender member, and means for rotating said shaft, substantially as and for the purpose set forth.

In testimony whereof I affix my signature in presence of two witnesses.

JAMES J. O'DELL.

Witnesses:
EMMA W. O'DELL,
G. J. MEAD.